United States Patent
Breton et al.

(10) Patent No.: US 9,924,021 B2
(45) Date of Patent: Mar. 20, 2018

(54) ENVIRONMENT CONTROLLERS CAPABLE OF CONTROLLING A PLURALITY OF SMART LIGHT FIXTURES

(71) Applicant: Distech Controls Inc., Brossard (CA)

(72) Inventors: Danny Breton, Brossard (CA); Patrice Soucy, Brossard (CA); Iliass Yousfi, Brossard (CA); Ugo Sdruscia, Brossard (CA)

(73) Assignee: DISTECH CONTROLS INC., Brossard (CA)

( * ) Notice: Subject to any disclaimer, the term of this patent is extended or adjusted under 35 U.S.C. 154(b) by 0 days.

(21) Appl. No.: 15/454,417

(22) Filed: Mar. 9, 2017

(65) Prior Publication Data

US 2017/0264731 A1  Sep. 14, 2017

Related U.S. Application Data

(60) Provisional application No. 62/306,822, filed on Mar. 11, 2016.

(51) Int. Cl.
  *H04M 1/725* (2006.01)
  *H04L 29/08* (2006.01)
  (Continued)

(52) U.S. Cl.
  CPC .......... *H04M 1/7253* (2013.01); *H04L 67/12* (2013.01); *H04W 4/008* (2013.01); *H04W 84/12* (2013.01)

(58) Field of Classification Search
  CPC ............... H04L 67/125; H04L 12/2816; H04L 12/2818; H04L 67/12; H04M 1/7253; H04W 4/008; H04W 84/12
  See application file for complete search history.

(56) References Cited

U.S. PATENT DOCUMENTS 5,372,219 A * 12/1994 Peralta ............... F01M 11/0458
  123/196 S
8,588,749 B1 * 11/2013 Sadhvani ................ H04M 1/24
  379/1.01

(Continued)

FOREIGN PATENT DOCUMENTS

WO    2016178572 A1    11/2016

*Primary Examiner* — Devan Sandiford
(74) *Attorney, Agent, or Firm* — RatnerPrestia

(57) ABSTRACT

Environment controllers for the configuration and control of a plurality of smart light fixtures. A master environment controller exchange data with a fixture management server and a plurality of slave environment controllers. Each slave environment controller is in charge of controlling a plurality of light fixtures. The master environment controller receives a command targeting a particular light fixture from the fixture management server. The environment controller determines a target slave environment controller in charge of controlling the particular light fixture, among the plurality of slave environment controllers. The master environment controller forwards the received command to the target slave environment controller. The target slave environment controller further transmits the forwarded command to the particular light fixture. Alternatively, an independent environment controller is in charge of controlling a plurality of light fixtures under the direct supervision of a fixture management server, without using an intermediate master environment controller.

16 Claims, 6 Drawing Sheets

(51) Int. Cl.
*H04W 4/00* (2009.01)
*H04W 84/12* (2009.01)

(56) References Cited

U.S. PATENT DOCUMENTS

| | | | |
|---|---|---|---|
| 2009/0278479 A1 | 11/2009 | Platner et al. | |
| 2011/0185198 A1* | 7/2011 | Ukita | G06Q 50/06 713/300 |
| 2013/0024563 A1* | 1/2013 | Torigoe | H04L 69/40 709/224 |
| 2013/0293157 A1* | 11/2013 | Shea | H05B 37/0254 315/312 |
| 2013/0293877 A1 | 11/2013 | Ramer et al. | |
| 2014/0028219 A1* | 1/2014 | Chen | H05B 33/089 315/297 |
| 2014/0098247 A1* | 4/2014 | Rao | H04W 4/20 348/207.1 |
| 2014/0129613 A1* | 5/2014 | Van Depoel | H04L 67/125 709/202 |
| 2014/0159864 A1* | 6/2014 | Allen | G08C 17/02 340/5.61 |
| 2014/0175875 A1* | 6/2014 | Newman, Jr. | H04L 69/18 307/18 |
| 2014/0250498 A1* | 9/2014 | Yamasaki | H04L 9/00 726/4 |
| 2014/0354161 A1 | 12/2014 | Aggarwal et al. | |
| 2014/0358285 A1 | 12/2014 | Aggarwal et al. | |
| 2015/0048760 A1* | 2/2015 | Kwag | H05B 37/0272 315/297 |
| 2015/0097669 A1* | 4/2015 | Li | G08B 5/222 340/539.13 |
| 2015/0097682 A1* | 4/2015 | Rossi | G01N 27/02 340/628 |
| 2015/0098357 A1* | 4/2015 | Lupien | H04W 48/20 370/254 |
| 2015/0105880 A1* | 4/2015 | Slupik | H04L 12/2816 700/90 |
| 2015/0147067 A1 | 5/2015 | Ryan et al. | |
| 2015/0156030 A1* | 6/2015 | Fadell | H04L 12/2816 700/90 |
| 2015/0156031 A1* | 6/2015 | Fadell | H04L 12/2816 700/276 |
| 2015/0160623 A1* | 6/2015 | Holley | G05B 11/01 700/90 |
| 2015/0195099 A1* | 7/2015 | Imes | G05B 15/02 700/275 |
| 2015/0195100 A1* | 7/2015 | Imes | H04L 12/282 455/420 |
| 2015/0207849 A1* | 7/2015 | Chen | G06F 3/0482 715/736 |
| 2015/0341210 A1* | 11/2015 | Ranbro | H04N 5/247 709/222 |
| 2015/0348554 A1* | 12/2015 | Orr | G10L 17/22 704/275 |
| 2015/0350185 A1* | 12/2015 | Cairns | H04L 12/2816 726/7 |
| 2015/0366039 A1* | 12/2015 | Noori | H05B 37/0272 315/307 |
| 2015/0369618 A1* | 12/2015 | Barnard | H05B 37/0272 701/491 |
| 2015/0370615 A1* | 12/2015 | Pi-Sunyer | G05B 15/02 700/276 |
| 2016/0004237 A1* | 1/2016 | Mohan | G05B 15/02 700/275 |
| 2016/0028828 A1* | 1/2016 | Tadajewski | H04L 12/2818 370/254 |
| 2016/0043896 A1* | 2/2016 | Fiedler | H04L 41/0803 370/254 |
| 2016/0132031 A1* | 5/2016 | Kozura | H04L 12/2832 700/275 |
| 2016/0134470 A1* | 5/2016 | Cregg | H04L 41/0806 709/223 |
| 2016/0134632 A1* | 5/2016 | Cregg | H04L 63/10 398/40 |
| 2016/0149640 A1* | 5/2016 | Jovicic | H04B 10/116 398/127 |
| 2016/0219141 A1* | 7/2016 | Kant | H04M 1/72533 |
| 2016/0270195 A1* | 9/2016 | Ikehara | H05B 37/0272 |
| 2016/0277202 A1* | 9/2016 | Davis | H04L 12/282 |
| 2016/0344570 A1* | 11/2016 | Ong | H04L 12/2807 |
| 2016/0353558 A1* | 12/2016 | Nanahara | H05B 37/0272 |
| 2016/0353559 A1* | 12/2016 | Mann | H05B 37/0272 |
| 2017/0055333 A1* | 2/2017 | Chow | H05B 37/0272 |
| 2017/0187454 A1* | 6/2017 | Zhang | H04B 10/116 |
| 2017/0195046 A1* | 7/2017 | Cheon | H04B 10/116 |

* cited by examiner

ENVIRONMENT CONTROLLERS CAPABLE OF CONTROLLING A PLURALITY OF SMART LIGHT FIXTURES

TECHNICAL FIELD

The present disclosure relates to the field of environment control systems. More specifically, the present disclosure relates to environment controllers capable of controlling a plurality of smart light fixtures.

BACKGROUND

Systems for controlling environmental conditions, for example in buildings, are becoming increasingly sophisticated. A control system may at once control heating and cooling, monitor air quality, detect hazardous conditions such as fire, carbon monoxide release, intrusion, and the like. Such control systems generally include at least one environment controller, which receives measured environmental values, generally from external sensors, and in turn determines set-points or command parameters to be sent to controlled appliances. Environment controllers are increasingly becoming a central and critical point of control for buildings, and their capabilities are extended beyond traditional building automation and safety functionalities.

A smart light fixture is a new type of light fixture capable of interacting with a mobile computing device located in proximity of the smart light fixture. For instance, a plurality of smart light fixtures is deployed in a shopping center. A particular light fixture is capable of transmitting a unique pattern (e.g. a unique identifier) used by a mobile computing device for identifying the particular light fixture. The unique pattern is used to engage a user of the mobile computing device in a marketing offer for a product located in proximity of the particular light fixture. The engagement of the user is performed via a marketing application executed on the mobile computing device, which receives the marketing offer from a remote marketing server based on the unique pattern of the particular light fixture.

In order to provide an appropriate level of flexibility in the usage of the plurality of smart light fixtures for marketing purposes, each one of the plurality of smart light fixtures needs to be configured and controlled individually. There is therefore a need for environment controllers capable of controlling a plurality of smart light fixtures.

SUMMARY

In accordance with a first aspect, the present disclosure relates to a master environment controller. The master environment controller comprises a communication interface for exchanging data with a fixture management server and at least one slave environment controller. The master environment controller comprises memory for storing a mapping of each of the at least one slave environment controller with a plurality of fixtures. Each one of the plurality of fixtures is identified by a unique identifier. The master environment controller comprises a processing unit for receiving a command from the fixture management server via the communication interface. The command comprises a unique identifier of a target fixture. The processing unit determines a target slave environment controller among the at least one slave environment controller based on the unique identifier of the target fixture and the mapping stored in memory. The processing unit further transmits a command based on the received command to the target slave environment controller. The transmitted command comprises the unique identifier of the target fixture.

In accordance with a second aspect, the present disclosure relates to an environment controller. The environment controller comprises a communication interface for exchanging data with a plurality of fixtures. The environment controller comprises memory for storing a unique identifier for each one of the plurality of fixtures. The environment controller comprises a processing unit for receiving a command from one of a fixture management server or a master environment controller via the communication interface. The command comprises a target identifier. The processing unit determines a target fixture among the plurality of fixtures. The target fixture has a unique identifier corresponding to the target identifier. The processing unit further transmits a command based on the received command to the target fixture.

BRIEF DESCRIPTION OF THE DRAWINGS

Embodiments of the disclosure will be described by way of example only with reference to the accompanying drawings, in which.

DETAILED DESCRIPTION

Figure 1:
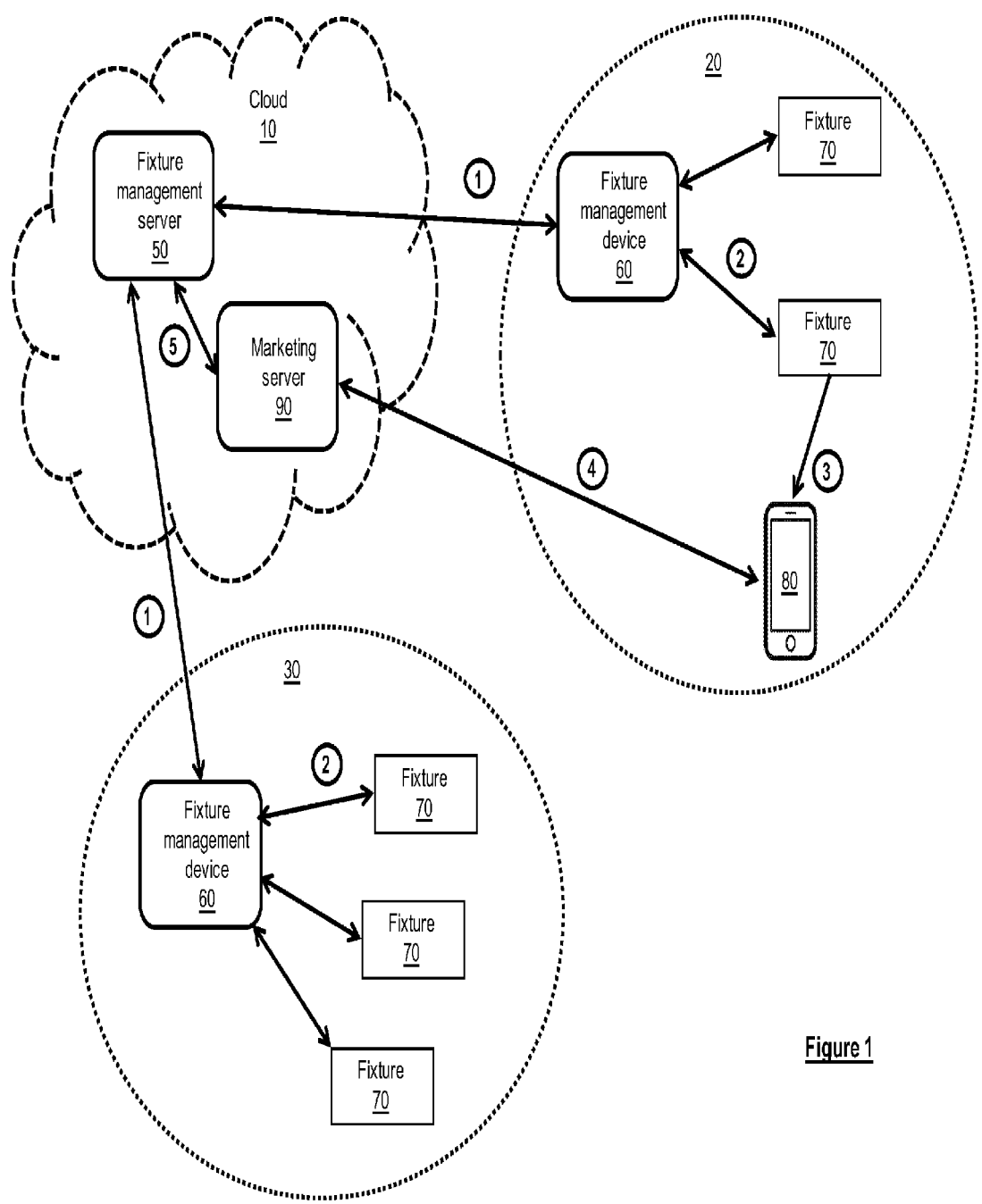
FIG. 1 illustrates an environment control system supporting light fixtures adapted for interacting with mobile computing devices.

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the usage of environment controllers for the configuration and control of a plurality of smart light fixtures.

Terminology

The following terminology is used throughout the present disclosure:

Smart light fixture: a light fixture adapted for interacting with a mobile computing device located in proximity of the light fixture. For simplification purposes, in the rest of the description, when a reference is made to a light fixture, it shall be understood as a smart light fixture.

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that are exchanged between components of an environment control system.

Environment control device (ECD): generic name for a component of an environment control system. An ECD consists of an environment controller, a sensor, a controlled appliance, etc.

Environment controller: device capable of receiving information related to an environment and sending commands based on such information.

Environmental characteristic: measurable, quantifiable or verifiable property of an environment.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation are sent to an environment controller.

Controlled appliance: device that receives a command and executes the command. The command is received from an environment controller.

Environmental state: a current condition of an environment based on an environmental characteristic, each environmental state comprises a range of values or verifiable representation for the corresponding environmental characteristic.

Communication interface: device or component capable of providing communication functionalities based on a specific communication technology (for example a standardized or proprietary wired communication technology, or a standardized or proprietary wireless communication technology). A specific protocol or set of protocols corresponding to the specific communication technology is implemented by the communication interface.

Wi-Fi: any Wireless Local Area Network (WLAN) product that is based on the Institute of Electrical and Electronics Engineers' (IEEE) 802.11 standards. However, in the rest of the description (for clarification purposes), any reference to Wi-Fi excludes the 802.11s standard which supports mesh communications over Wi-Fi. A direct mention of the 802.11s standard is used when appropriate.

Referring now to FIG. 1, an environment control system supporting light fixtures adapted for interacting with mobile computing devices is illustrated.

A first set of light fixtures 70 is deployed in a first geographical area 20. Only two light fixtures 70 are represented in the first geographical area 20 for simplification purposes. However, the number of light fixtures 70 in the first geographical area 20 is only limited by the number of light fixtures 70 which can be managed by a fixture management device 60, which is in charge of managing the light fixtures 70 of the first geographical area 20. The fixture management device 60 is adapted for configuring and controlling the light fixtures 70 deployed in the first geographical area 20. The fixture management device 60 operates in a standalone mode (not illustrated in FIG. 1), or under the control of a fixture management server 50 (as illustrated in FIG. 1).

A second set of light fixtures 70 is deployed in a second geographical area 30. Only three light fixtures 70 are represented in the second geographical area 30 for simplification purposes. However, the number of light fixtures 70 in the second geographical area 30 is only limited by the number of light fixtures 70 which can be managed by another fixture management device 60, which is in charge of managing the light fixtures 70 of the second geographical area 30. The other fixture management device 60 is adapted for configuring and controlling the light fixtures 70 deployed in the second geographical area 30. The other fixture management device 60 also operates in a standalone mode (not illustrated in FIG. 1), or under the control of the fixture management server 50 (as illustrated in FIG. 1).

The number of geographical areas (e.g. 20 and 30) under the control of the fixture management server 50 is not limited to two, and may vary substantially based on the capabilities of the fixture management server 50, based on specific criteria in the determination of the geographical areas, based on the number of light fixtures 70 which can be supported in a single geographical area, etc. For example, each geographical area (e.g. 20 and 30) corresponds to a particular store of a retail chain, each geographical area (e.g. 20 and 30) corresponds to a particular department (e.g. women or men clothing, toys, sports, etc.) of a general store, etc.

As illustrated in FIG. 1, the fixture management server 50 operates in the cloud 10, and the interactions between the fixture management server 50 and the fixture management devices 60 consist in cloud based client/server interactions, as is well known in the art. The cloud 10 consists of an Intranet, an Extranet, the Internet, a combination thereof, etc., as is well known in the art 10.

The fixture management server 50 transmits commands 1 for configuring and controlling the light fixtures 70 to the fixture management devices 60, which forward them to the light fixtures 70. A command 2 transmitted by a fixture management device 60 to a light fixture 70 is either a replica of the corresponding command 1 received from the fixture management server 50, or is an adaptation of the corresponding command 1 after processing of the corresponding command 1 by the fixture management device 60.

The commands 1 and 2 are used for configuring and controlling various functionalities and operating conditions of the light fixtures 70, and will be described in more details later in the description. Additionally, the light fixtures 70 may transmit feedback data (not represented in FIG. 1 for simplification purposes) to the fixture management devices 60, such as acknowledgments of the commands 2, current operating conditions, statistics, warning or failure reports, etc. The feedback data are integrally processed by the fixture management devices 60, or partially processed by the fixture management devices 60 and forwarded to the fixture management server 50 for further processing.

More specifically, the commands 1 and 2 are used for configuring and controlling the functionality allowing the light fixtures 70 to interact with mobile computing devices 80. The mobile computing devices 80 generally consist of a smartphone or a tablet, but are not limited to these types of mobile computing devices. A particular light fixture 70 generates an interaction 3 with a particular mobile computing device 80 when it is located in proximity of the light fixture 70. The interaction 3 includes the transmission of a unique pattern identifying the particular light fixture 70. The unique pattern is used to engage a user of the particular mobile computing device 80 in a marketing offer. For example, coupons are offered for products located in proximity of the particular light fixture 70. The engagement of the user is performed via a marketing application executed on the particular mobile computing device 80. The marketing application interacts with a marketing server 90. For illustration purposes, the marketing server 90 is also located in the cloud 10. The marketing application transmits the unique pattern of the particular light fixture 70 to the marketing server 90, and receives the corresponding coupons in return. Alternatively, or complementarily, instructions for guiding the user of the particular mobile computing device 80 to a specific location in proximity of the particular light fixture 70, where specific products are in promotion, are received from the marketing server 90. The marketing server 90 stores a mapping between the unique patterns of the light fixtures 70, and the corresponding marketing offers which are tailored for each particular light fixture 70.

The engagement of the users of the mobile computing devices 80 via the interactions 3 with the light fixtures 70 is not limited to marketing offers, but includes any type of location based services, as is well known in the art.

Data 5 are also exchanged between the marketing server 90 and the fixture management server 50. For instance, an administrator of the marketing server 90 configures the mapping between the unique patterns of the light fixtures 70 and the corresponding marketing offers, for a particular day, for a particular period of a day, etc. The administrator determines which of the light fixtures 70 shall be interacting 3 with mobile computing devices 80 and which light fixtures 70 shall not be interacting. The administrator also determines the particular marketing offer(s) associated with each interacting light fixture 70. The unique patterns of the interacting light fixtures 70 are transmitted by the marketing server 90 to the fixture management server 50. The fixture management server 50 generates and transmits commands 1 for configuring/controlling the interacting light fixtures 70 accordingly.

A first type of technology used for implementing the interactions 3 of the light fixtures 70 with the mobile computing devices 80 consists in Visual Light Communication (VLC). Each particular light fixture 70 includes a Light Emitting Diode (LED) transmitting a particular light pattern, which acts as a beacon for signaling a mobile computing device 80 in proximity of the particular light fixture. The particular light pattern is representative of the unique pattern of the particular light fixture 70. A camera of the mobile computing device 80 receives the particular light pattern and the marketing application executed by the mobile computing device 80 is capable of determining the unique pattern of the particular light fixture 70 based on the received particular light pattern.

A second type of technology used for implementing the interactions 3 of the light fixtures 70 with the mobile computing devices 80 consists in Bluetooth Low Energy (BLE). Each particular light fixture 70 includes a BLE interface capable of interacting with a mobile computing device 80 supporting BLE and in proximity of the particular light fixture 70. The unique pattern of the particular light fixture 70 is transmitted to the mobile computing device 80 via the BLE protocol. Optionally, additional information is also transmitted via the BLE protocol. The marketing application executed by the mobile computing device 80 receives the unique pattern and the optional additional information via a BLE interface of the mobile computing device 80.

Other types of technologies may be used for implementing the interactions 3 of the light fixtures 70 with the mobile computing devices 80, as long as these technologies are supported by the light fixtures 70 and the mobile computing devices 80, and as long as these technologies support at least the transmission of the unique pattern of the light fixtures 70 from the light fixtures 70 to the mobile computing devices 80.

The light fixtures 70 include dedicated components for supporting their advanced interactions capabilities, such as a processing unit, memory, a communication interface for interacting with the mobile computing devices 80 (e.g. a BLE interface), a controllable LED (e.g. for implementing VLC), a communication interface for interacting with the fixture management devices 60 (it will be detailed later in the description), etc.

For each geographical area (e.g. 20 or 30), all of the light fixtures 70 of the geographical area support the same technology for interacting with the mobile computing devices 80 (e.g. either one of VLC or BLE). Alternatively, some of the light fixtures 70 support one technology (e.g. VLC) while others support another technology (e.g. BLE). Some of the light fixtures 70 may support several technologies (e.g. VLC and BLE), and are configured by the fixture management devices 60 to use them concurrently or simultaneously.

Figure 2:
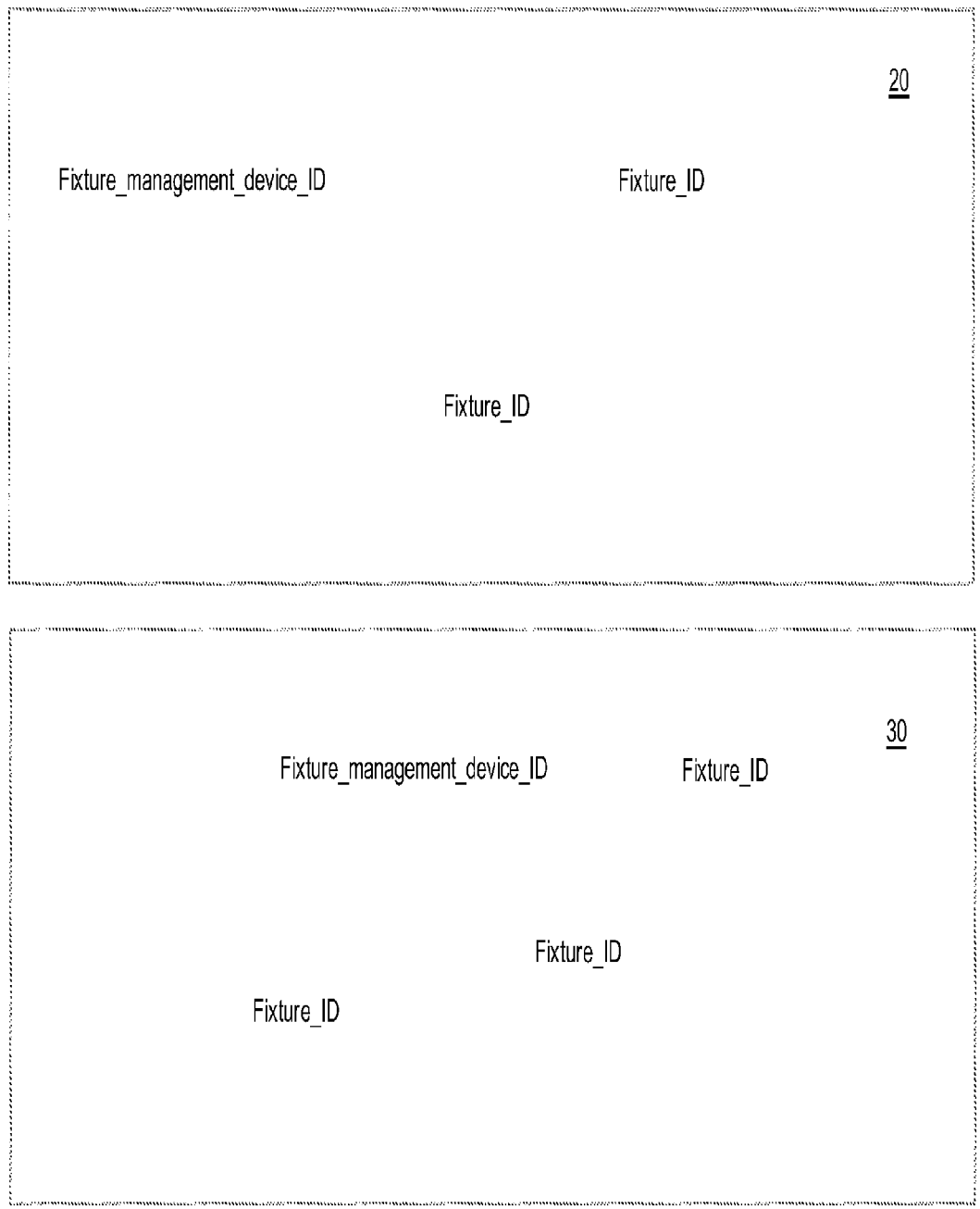
FIG. 2 illustrates a unique identification of the light fixtures of FIG. 1.

Reference is now made concurrently to FIGS. 1 and 2. FIG. 2 illustrates how each light fixture 70 represented in FIG. 1 is identified by a unique identifier. The unique identifier can be used as the previously described unique pattern used for the interactions between the light fixtures and the mobile computing devices.

In a first implementation, each light fixture 70 has a Fixture_ID that is unique across all the geographical areas (e.g. 20 and 30) supported by the fixture management server 50. For instance, the Fixture_ID of any light fixture 70 located in the first geographical area 20 is different from the Fixture_ID of any light fixture 70 located in the second geographical area 30 (or any other geographical area under the control of the fixture management server 50.

In a second implementation, each light fixture 70 has a Fixture_ID that is unique across a single geographical area (e.g. 20 or 30) supported by the fixture management server 50. For instance, the Fixture_ID of a light fixture 70 located in the first geographical area 20 may be the same as the Fixture_ID of a light fixture 70 located in the second geographical area 30. Each fixture management device 60 has a Fixture_management_device_ID that is unique across all the geographical areas (e.g. 20 and 30) supported by the fixture management server 50. The unique identifier of a light fixture 70 consists in the combination of its Fixture_ID and the Fixture_management_device_ID of the fixture management device 60 from which it depends.

A person skilled in the art will readily understand that other ways of uniquely identifying the light fixtures 70 may be used.

For the light fixtures 70 supporting the VLC technology, the light pattern used by a particular light fixture 70 for interacting 3 with a mobile computing device 80 is representative of one of the following: the Fixture_ID of the particular light fixture 70, the combination of the Fixture_ID of the particular light fixture 70 with the Fixture_management_device_ID of the fixture management device 60 from which it depends, etc.

For the light fixtures 70 supporting the BLE technology, the information transmitted by a particular light fixture 70 for interacting 3 with a mobile computing device 80 comprises one of the following: the Fixture_ID of the particular light fixture 70, the combination of the Fixture_ID of the particular light fixture 70 with the Fixture_management_device_ID of the fixture management device 60 from which it depends, etc.

A Fixture_ID is allocated to each light fixture 70 during manufacturing of the light fixtures, and stored in a memory of the light fixtures. Alternatively, the Fixture_ID of a light fixture 70 is automatically determined by a processing unit of the light fixture (based for example on a part number of the light fixture), and stored in a memory of the light fixture. In still another alternative, the Fixture_ID of the light fixtures 70 is generated at one of the fixture management server 50 or fixture management device 60, and transmitted to the light fixtures 70 via a configuration protocol. Similarly, the Fixture_management_device_ID of a fixture management device 60 is transmitted by the fixture management device 60 to all the light fixtures 70 under its control via a configuration protocol.

Figure 3:
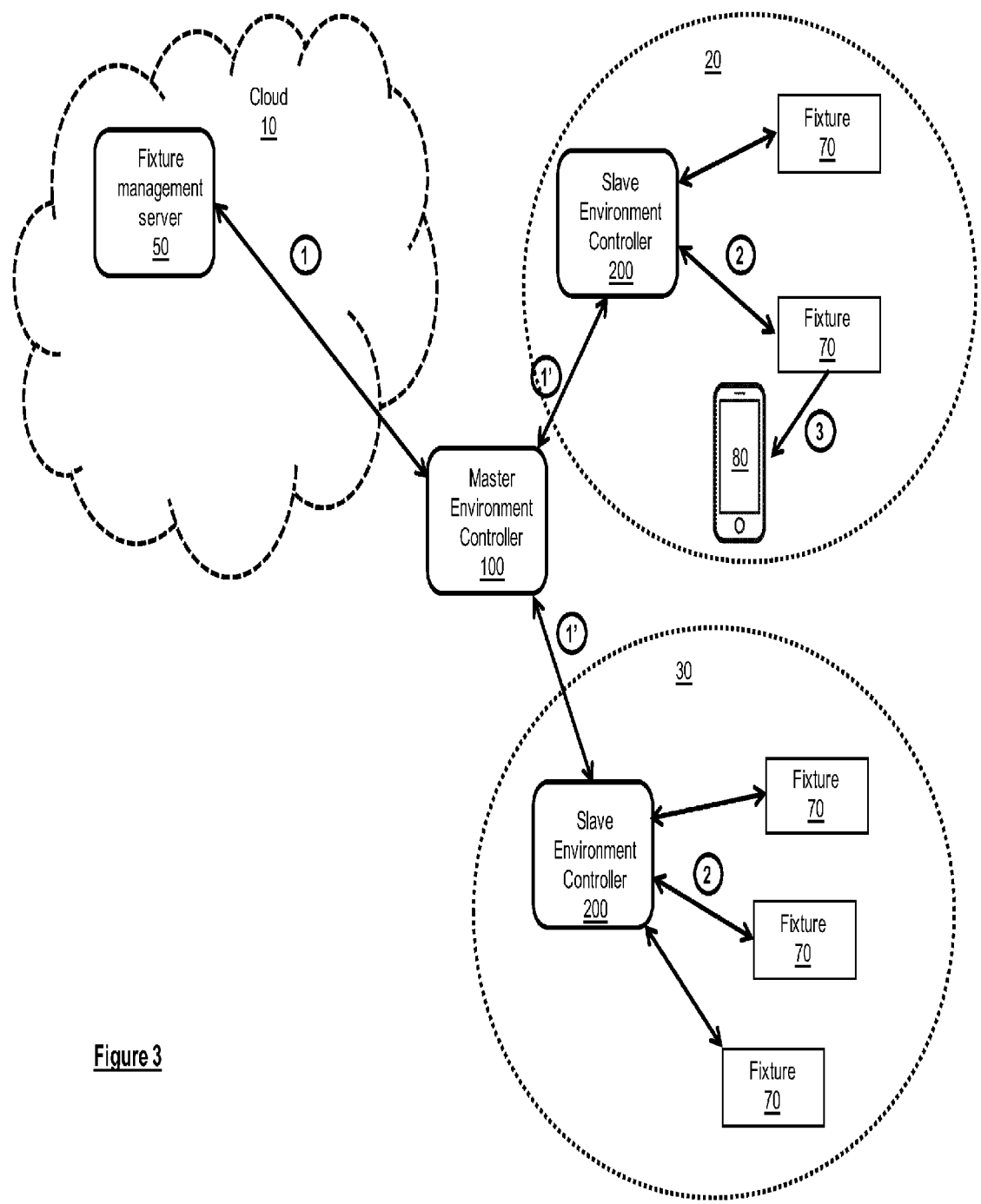
FIG. 3 illustrates a master environment controller and several slave environment controllers for controlling the light fixtures of FIG. 1.
Figure 4:
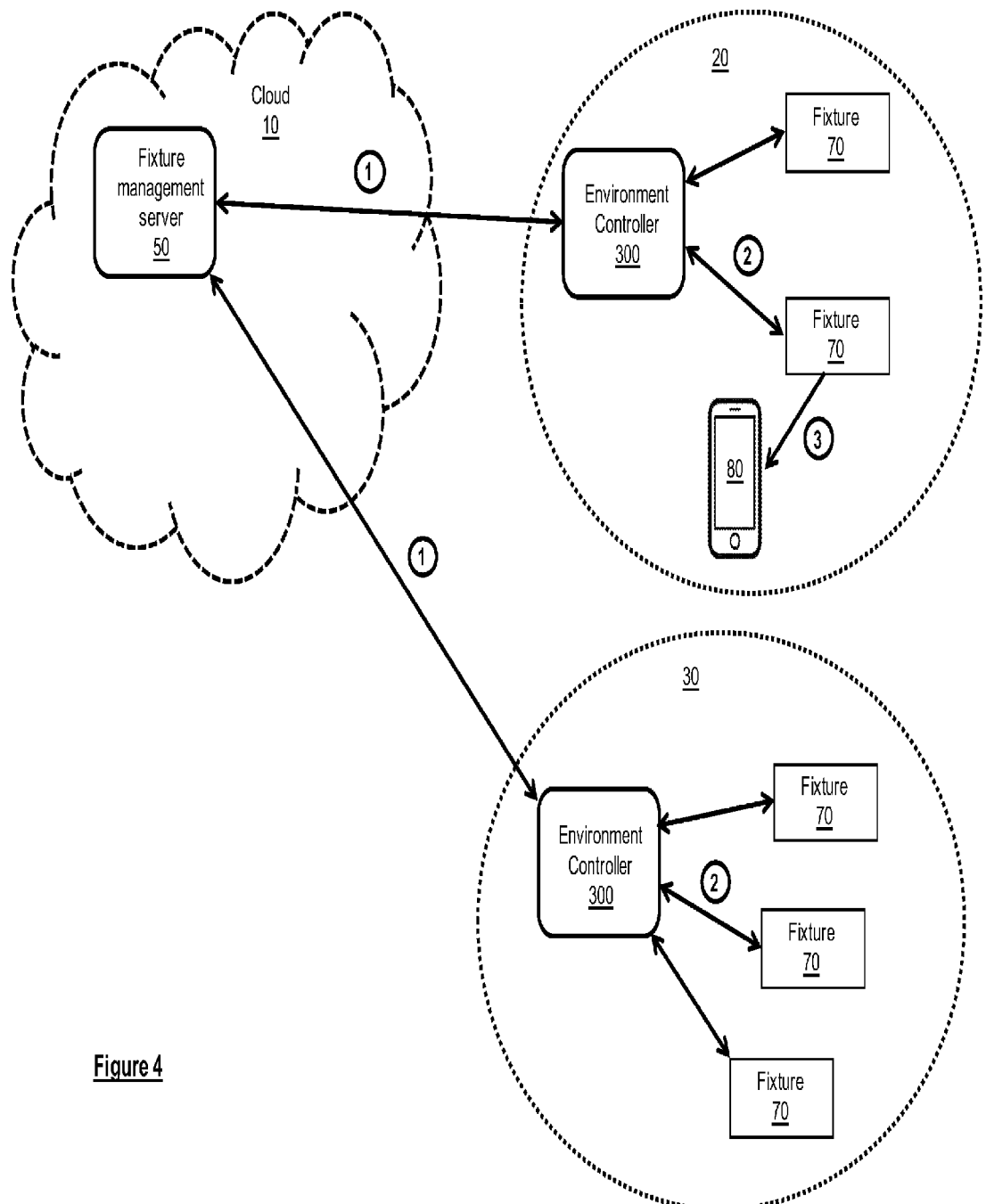
FIG. 4 illustrates several independent environment controllers for controlling the light fixtures of FIG. 1.

Reference is now made concurrently to FIGS. 1, 3 and 4. FIGS. 3 and 4 illustrate the use of environment controllers for implementing the functionalities of the fixture management devices 60 represented in FIG. 1.

An environment controller is a specific type of environment control device (ECD) capable of interacting with a plurality of other ECDs, such as sensors and controlled appliances. The environment controller(s), sensors and controlled appliances form an environment control system used for building control, building automation, building safety management, etc. For example, an environment controller receives an environmental characteristic value from a sensor, determines an environmental state based on a processing of the environmental characteristic value, generates a command based on a processing of the generated environmental state and optionally other environment states stored at the environment controller, and transmits the command to a controlled appliance.

Instead of using dedicated fixture management devices 60 which only support the functionality of configuring and controlling the light fixtures 70, multi-purpose environment controllers are used. The environment controllers support the functionality of configuring and controlling the light fixtures 70, and also support other functionalities such as interacting with sensors and other types of controlled appliances (such as a temperature thermostat, a ventilation system, an apparatus on/off switch, a surveillance camera, etc.). Such an environment controller is capable of controlling the light fixtures 70 located in a particular geographical area (e.g. 20 or 30), as well as other controlled appliances located in the particular geographical area.

Furthermore, a legacy environment controller supporting various types of sensors and controlled appliances can be upgraded to also support the light fixtures 70, by updating its software with a new software capable of configuring and controlling the light fixtures 70.

Referring more particularly to FIG. 3, an environment control system comprising a master environment controller 100 and a plurality of slave environment controllers 200 is illustrated. Each slave environment controller 200 is in charge of configuring and controlling the light fixtures 70 of a particular geographical area (e.g. 20 or 30).

The master environment controller 100 receives commands 1 for configuring and controlling the light fixtures 70 from the fixture management server 50. For each command 1 targeting a particular light fixture 70, the master environment controller 100 determines which slave environment controller 200 is in charge of the target light fixture 70. The master environment controller 100 transmits to the slave environment controller 200 in charge of the target light fixture 70 a command 1' corresponding to the command 1. The slave environment controller 200 in charge of the target light fixture 70 processes the command 1' and transmits a corresponding command 2 to the target light fixture 70.

A command 1 transmitted by the fixture management server 50 may include a plurality of sub-commands, each sub-command targeting a particular light fixture 70. The master environment controller 100 generates a plurality of commands 1' corresponding to the plurality of sub-commands. Each command 1' is transmitted to the slave environment controller 200 in charge of the light fixture 70 targeted by the corresponding sub-command. Several commands 1' addressed to the same slave environment controller 200 can be grouped in a single macro-command for efficiency purposes.

Referring more particularly to FIG. 4, an environment control system comprising a plurality of environment controllers 300 is illustrated. Each environment controller 300 is in charge of configuring and controlling the light fixtures 70 of a particular geographical area (e.g. 20 or 30), and communicates directly with the fixture management server 50 (without an intermediate master environment controller 100 as illustrated in FIG. 3).

An environment controller 300 receives commands 1 from the fixture management server 50, for configuring and controlling the light fixtures 70 located in the geographical area (e.g. 20 or 30) under its control. For each command 1 targeting a particular light fixture 70, the environment controller 300 in charge of the target light fixture 70 processes the command 1 and transmits a corresponding command 2 to the target light fixture 70.

A command 1 transmitted by the fixture management server 50 may include a plurality of sub-commands, each sub-command targeting a particular light fixture 70. The environment controller 300 generates a plurality of commands 2 corresponding to the plurality of sub-commands. Each command 2 is transmitted to the particular light fixture 70 targeted by the corresponding sub-command.

Although the present disclosure teaches the usage of environment controllers for configuring and controlling light fixtures, other types of fixtures 70 may support the interactions 2 with the slave environment controllers 200 represented in FIG. 3 and the environment controllers 400 represented in FIG. 4, as well as the interactions 3 with the mobile computing device 80 represented in FIG. 1. These other types of fixtures are controlled and configured by the environment controllers in a similar manner as the light fixtures.

Figure 5:
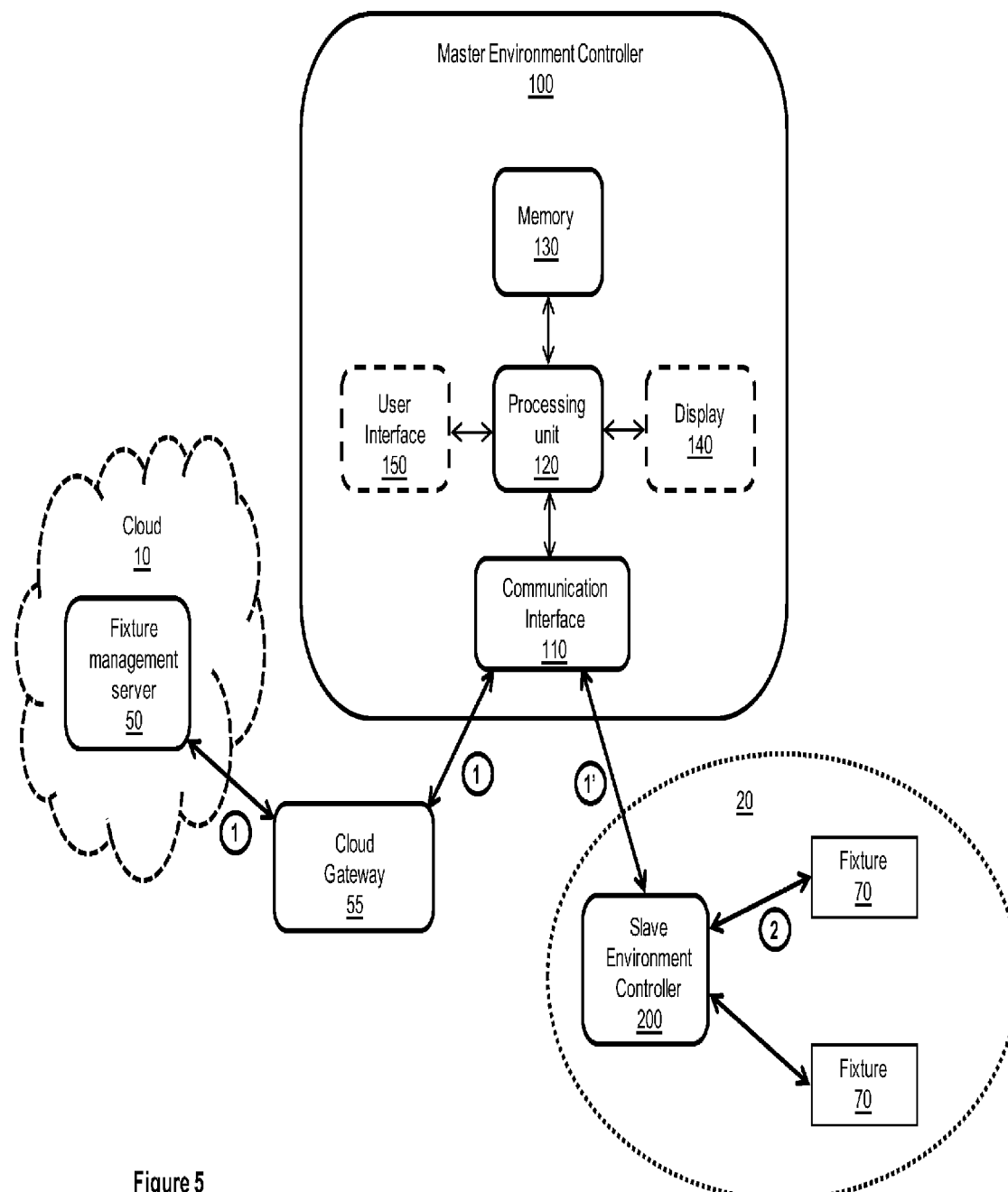
FIG. 5 is a schematic detailed representation of the master environment controller of FIG. 3.
Figure 6:
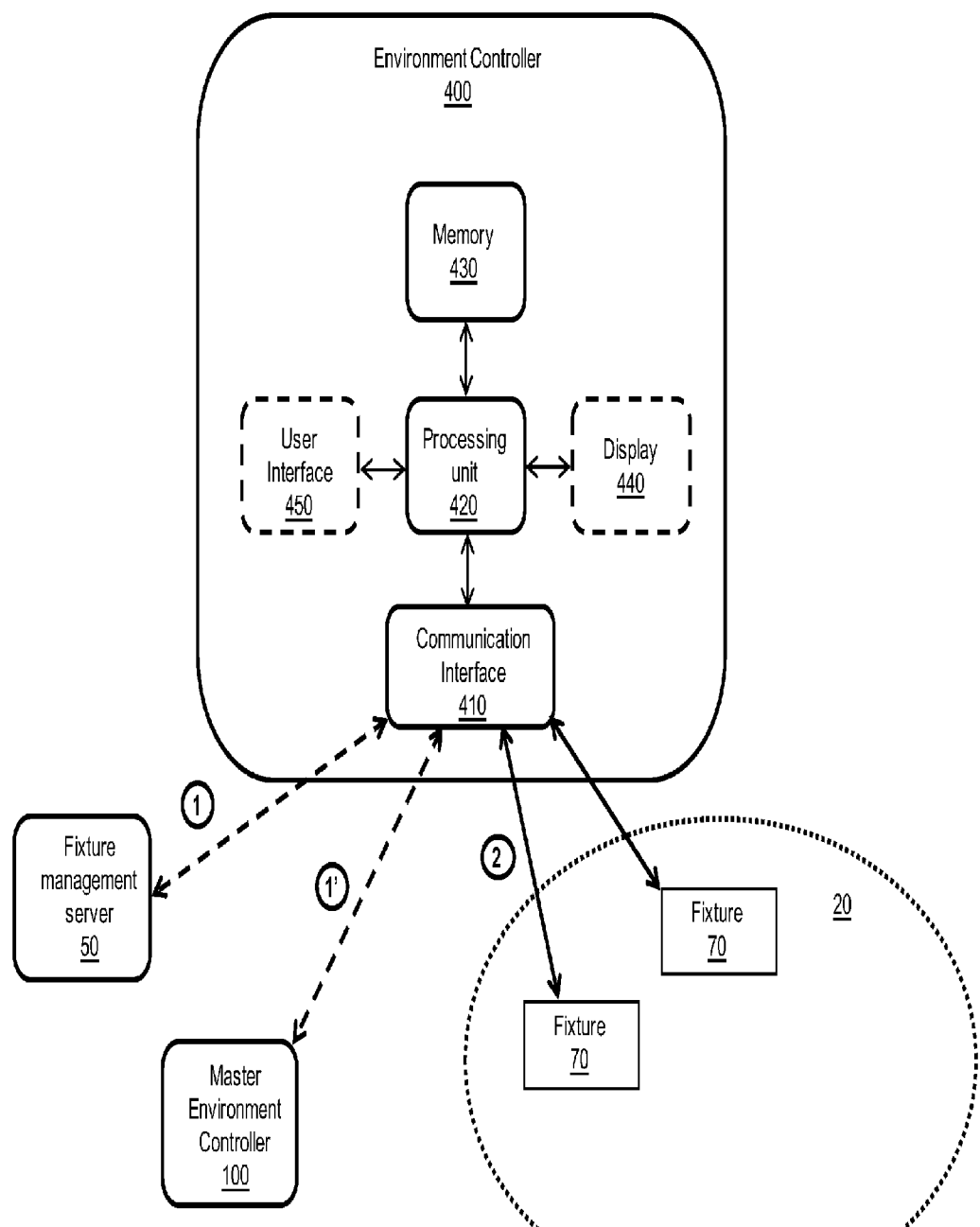
FIG. 6 is a schematic detailed representation of the slave environment controllers of FIG. 3 or the independent environment controllers of FIG. 4

Referring now concurrently to FIGS. 3 and 5, the master environment controller 100 and its interactions with other devices will be detailed.

The master environment controller 100 comprises a processing unit 120, having one or more processors (not represented in FIG. 5 for simplification purposes) capable of executing instructions of computer program(s) for performing the functionalities of the master environment controller 100 (receiving data, processing the received data, transmitting new data based on the processed data, etc.). Each processor may further have one or several cores.

The master environment controller 100 comprises memory 130 for storing instructions of the computer program(s) executed by the processing unit 120, data generated by the execution of the computer program(s), data received via a communication interface 110, etc. The master environment controller 100 may comprise several types of memories, including volatile memory, non-volatile memory, etc.

The master environment controller 100 comprises the communication interface 110 for exchanging data with other devices through wired and/or wireless communication links.

The master environment controller 100 may comprise at least one display 140 for displaying data generated by the processing unit 120, information received via the communication interface 110 or via a user interface 150, etc. A single display 140 is represented in FIG. 5 for simplification purposes. Examples of display units 140 include tactile screens, etc.

The master environment controller 100 may comprise at least one user interface 150 for allowing a user to interact therewith, for instance for configuring/reconfiguring the master environment controller 100. A single user interface 150 is represented in FIG. 5 for simplification purposes. Examples of user interface(s) 150 include a trackpad, a touch screen, etc.

The memory 130 stores a mapping of each slave environment controller 200 under the control of the master environment controller 100 with a plurality of light fixtures 70. More specifically, each slave environment controller 200 is mapped to the light fixtures 70 under its control. For example, the slave environment controller 200 represented in FIG. 5 is mapped to all the light fixtures 70 located in the geographical area 20. Each light fixture 70 mapped to a particular one of the slave environment controllers 200 is identified by a unique identifier. For example, the unique identifier consists of the Fixture_ID or the combination of the Fixture_ID with the Fixture_management_device_ID, which have been described previously in relation to FIG. 2. The Fixture_management_device_ID is a unique identifier of the slave environment controllers 200.

The mapping is generated at the fixture management server 50 and transmitted to the master environment controller 100. The processing unit 120 receives the mapping via the communication interface 110 and stores the mapping in the memory 130. Alternatively, the mapping is generated directly at the master environment controller 100, through interactions of a user (e.g. a system administrator) with the user interface 150. For example, the processing unit 120 displays a dedicated Graphical User Interface (GUI) on the display 140, generates the mapping through the interactions of the user with the user interface 150, and stores the generated mapping in the memory 130.

The processing unit 120 receives a command 1 from the fixture management server 50 via the communication interface 110. The command 1 comprises a unique identifier of a target light fixture 70.

The processing unit 120 determines a target slave environment controller 200 among the slave environment controllers 200 under the control of the master environment controller 100 (e.g. one of the slave environment controllers 200 in charge of geographical areas 20 and 30). The determination is based on the unique identifier of the target fixture 70 and the mapping stored in the memory 130. More specifically, the target slave environment controller 200 is the slave environment controller mapped to the unique identifier of the target fixture 70. For example, the slave environment controller 200 represented in FIG. 5, which is in charge of the light fixtures 70 located in the geographical area 20, is the target slave environment controller.

The processing unit 120 transmits a command 1' based on the received command 1 to the target slave environment controller 200. The command 1' comprises the unique identifier of the target fixture 70. The command 1' is either identical to the original command 1, or is a command generated by the processing unit 120 based on the original command 1 which comprises more or less data than the original command 1.

The communication interface 110 is adapted for exchanging data with the slave environment controller(s) 200 over one of the following: a Wi-Fi network (without mesh capabilities), a mesh network, and a combination thereof. The exchanged data comprise the command 1'. A particular type of mesh network which may be supported by the communication interface 110 is a mesh network based on the 802.11s standard (mesh Wi-Fi). The communication interface 110 may be adapted to support other types of networks, such as an Ethernet network, a Bluetooth network, a cellular network, etc. The commands 1 and 1' are respectively received and transmitted by the communication interface 110 over the same or different networks.

FIG. 5 illustrates a network configuration where an intermediate cloud gateway 55 receives the commands 1 from the fixture management server 50, and forwards them to the master environment controller 100. For example, the cloud gateway 55 and the master environment controller 100 exchange data (including the commands 1) over an Ethernet or a Wi-Fi network. In an alternative configuration represented in FIG. 3, the master environment controller 100 is directly connected to the fixture management server 50. For example, the fixture management server 50 and the master environment controller 100 exchange data (including the commands 1) over an Ethernet or a Wi-Fi network.

Referring now concurrently to FIGS. 3, 4, 5 and 6, an environment controller 400 (represented in FIG. 6) capable of interacting with the light fixtures 70 will be detailed.

In a first configuration illustrated in FIG. 3, the environment controller 400 corresponds to a slave environment controller 200 controlled by the master environment controller 100. The environment controller 400 is not directly controlled by the fixture management server 50.

In a second configuration illustrated in FIG. 4, the environment controller 400 corresponds to an independent environment controller 300 directly controlled by the fixture management server 50, without using an intermediate master environment controller.

The hardware components of the environment controller 400 are simulator to the hardware components of the master environment controller 100 of FIG. 3, although some specific hardware components may be added, modified, or missing. The respective specific functionalities of the environment controller 400 and the master environment controller 100 of FIG. 3 are generally obtained by using dedicated software(s).

The environment controller 400 comprises a processing unit 420 with characteristics similar to the one described previously with respect to the processing unit 120 of the master environment controller 100 of FIG. 3.

The environment controller 400 comprises memory 430 with characteristics similar to the one described previously with respect to the memory 130 of the master environment controller 100 of FIG. 3.

The environment controller 400 comprises a communication interface 410 for exchanging data with other devices through wired and/or wireless communication links.

The environment controller 400 may comprise at least one display 440 with characteristics similar to the one described previously with respect to the display(s) 140 of the master environment controller 100 of FIG. 3.

The environment controller 400 may comprise at least one user interface 450 with characteristics similar to the one described previously with respect to the user interface(s) 150 of the master environment controller 100 of FIG. 3.

The memory 430 stores a unique identifier for each of the light fixtures 70 under the control of the environment controller 400. For example, the environment controller 400 represented in FIG. 6 stores the unique identifier of all the light fixtures 70 located in the geographical area 20. For example, the unique identifier consists of the Fixture_ID or the combination of the Fixture_ID with the Fixture_management_device_ID, which have been described previously in relation to FIG. 2. The Fixture_management_device_ID is a unique identifier of the environment controllers 400.

The unique identifier of a particular light fixture 70 is further mapped to at least one networking identifier used for transmitting data from the environment controller 400 to the particular light fixture 70. Examples of networking identifiers include a Media Access Control (MAC) address, an Internet Protocol (IP) address, etc. The mapping is also stored in the memory 430. In a particular implementation, the unique identifier of the particular light fixture 70 is directly a networking identifier, for instance the MAC address. However, in some cases, it is preferable to use logical identifiers instead of networking identifiers for the unique identifiers of the light fixtures 70, in order to introduce a level of abstraction with respect to the networking topology of the geographical area 20.

The list of unique identifiers of the light fixtures 70 under the control of the environment controller 400 is generated at the fixture management server 50 or at an environment controller 100, and transmitted to the environment controller 400. The processing unit 420 receives the list of unique identifiers of the light fixtures 70 via the communication interface 410 and stores them in the memory 430. Alternatively, the list of unique identifiers of the light fixtures 70 is generated directly at the environment controller 400, through interactions of a user (e.g. a system administrator) with the user interface 450. For example, the processing unit 420 displays a dedicated Graphical User Interface (GUI) on the display 440, generates the list of unique identifiers of the light fixtures 70 through the interactions of the user with the user interface 450, and stores the generated list of unique identifiers of the light fixtures 70 in the memory 430.

Similarly, the mapping between the list of unique identifiers of the light fixtures 70 and the corresponding networking identifier(s) is generated at the environment controller 400, through interactions of a user (e.g. a system administrator) with the user interface 450. Alternatively, the mapping is generated at a master environment controller 100, and transmitted to the environment controller 400. In yet another alternative, the mapping is automatically generated at the environment controller 400 by its processing unit 420, using device discovery protocols and algorithms known in the art.

The processing unit 420 receives a command 1 from the fixture management server 50 or a command 1' from the master environment controller 100, via the communication interface 110. The command 1 or 1' comprises a target identifier. The reception of the command 1 corresponds to the use case illustrated in FIG. 4, where the environment controller 400 (corresponding to an environment controller 300) is directly controlled by the fixture management server 50. The reception of the command 1' corresponds to the use case illustrated in FIG. 3, where the environment controller 400 (corresponding to a slave environment controller 200) is controlled by the master environment controller 100.

The processing unit 420 determines a target fixture 70 among the plurality of fixtures under its control. The target fixture 70 has a unique identifier corresponding to the target identifier of the received command 1 or 1'. The processing unit 420 browses through the list of unique identifiers stored in the memory 430 to find a match between one of the stored unique identifiers and the received target identifier. If no match is found, no further action is taken (except for a failure report which may be sent back to the originating fixture management server 50 or master environment controller 100).

The processing unit 420 transmits a command 2 based on the received command 1 or 1' to the target light fixture 70. The command 2 is either identical to the original command 1 or 1', or is a command generated by the processing unit 420 based on the original command 1 or 1' which comprises more or less data than the original command 1 or 1'. The command 2 may comprise the unique identifier of the target fixture 70, if the target fixture 70 needs the unique identifier for executing the command.

The command 2 is received by the target light fixture 70, processed by a processing unit of the light fixture 70, and actions based on the command 2 are executed by the light fixture 70 under the control of its processing unit. The processing unit of a light fixture 70 consists in one or more processors, a Field-Programmable Gate Array (FPGA), an Application-Specific Integrated Circuit (ASIC), etc. Examples of such actions will be detailed later in the description.

The communication interface 410 is adapted for exchanging data with the light fixtures 70 over one of the following: a Wi-Fi network (without mesh capabilities), a mesh network, a Bluetooth Low Energy (BLE) network, and a combination thereof. In a particular implementation, the communication interface 410 exchanges data with a subset of the light fixtures 70 using a first networking technology (e.g. mesh networking), and uses another networking technology (e.g. BLE) for another subset of the light fixtures 70. The exchanged data comprise the command 2. A particular type of mesh network which may be supported by the communication interface 410 is a mesh network based on the 802.11s standard (mesh Wi-Fi). The communication interface 410 may be adapted to support other types of networks, such as an Ethernet network, a cellular network, etc., for exchanging data (e.g. the commands 1 or 1') with the fixture management server 50 or the master environment controller 100.

The fixture management server 50 may be implemented by an environment controller acting as a master environment controller with respect to slave environment controllers 300.

Referring now concurrently to FIGS. 3 and 4, examples of commands for configuring and controlling the light fixtures 70 will be provided.

A first example of command 1 generated and transmitted by the fixture management server 50 comprises a software update for a target light fixture 70. In the deployment illustrated in FIG. 3, the master environment controller 100 receives the command 1 comprising the software update and transmits a command 1' comprising the software update to the appropriate slave environment controller 200. The slave environment controller 200 receives the command 1' comprising the software update and transmits a command 2 comprising the software update to the target light fixture 70. In the deployment illustrated in FIG. 4, the appropriate environment controller 300 receives the command 1 comprising the software update and transmits a command 2 comprising the software update to the target light fixture 70. In the deployment illustrated in FIG. 3, the command 1' comprising the software update for the target light fixture 70 may be generated and transmitted directly by the master environment controller 100, independently of the fixture management server 50. Upon reception of the command 2, the target light fixture 70 upgrades its software using the software update comprised in the command 2. The commands 1, 1' and 2 may also comprise a time period. The time period includes a delay for performing the software upgrade after reception of the command 2 by the target light fixture 70, or a precise date and time at which the target light fixture 70 shall perform the software upgrade. This allows synchronization of a software upgrade across a plurality of light fixtures. Additionally, instead of a single target light fixture, the software upgrade may be directed to a plurality of light fixtures, for example all the light fixtures 70 of the geographical area 20 under the control of the slave environment controller 200 in FIG. 3 or under the control of the environment controller 300 in FIG. 4. The commands 1 and 1' comprise a specific identifier (e.g. a unique identifier of a target slave environment controller 200 in FIG. 3 or a unique identifier of a target environment controller 300 in FIG. 4) in place of the unique identifier for identifying a target fixture. Furthermore, the command 2 may be implemented via a broadcast message, for prompting all the light fixtures of the geographical area 20 to perform the software upgrade.

Another example of command 1 generated and transmitted by the fixture management server 50 comprises an activation or a deactivation of the interactions of the target light fixture 70 with mobile computing devices 80. As mentioned previously, the interactions are based on various technologies, including VLC, BLE, etc. In the deployment illustrated in FIG. 3, the transmission via commands 1, 1' and 2 of the activation or deactivation to the target light fixture 70 is similar to the aforementioned transmission of the software update. In the deployment illustrated in FIG. 3, the transmission via commands 1 and 2 of the activation or deactivation to the target light fixture 70 is also similar to the aforementioned transmission of the software update. The commands 1, 1' and 2 may also comprise a time period. The time period includes a delay for performing the activation or deactivation after reception of the command 2 by the target light fixture 70, or a precise date and time at which the target light fixture 70 shall perform the activation or deactivation. This allows synchronization of an activation or deactivation across a plurality of light fixtures. Additionally, instead of a single target light fixture, the activation or deactivation may be directed to a plurality of light fixtures, for example all the light fixtures 70 of the geographical area 20 under the control of the slave environment controller 200 in FIG. 3 or under the control of the environment controller 300 in FIG. 4. The command 2 may be implemented via a broadcast message, for prompting all the light fixtures of the geographical area 20 to active or deactivate interactions with the mobile computing device 80.

As mentioned previously, the interactions between a particular light fixture 70 and the surrounding mobile computing devices 80 are based on the transmission 3 of a unique pattern from the particular light fixture 70 to the surrounding mobile computing devices 80. The unique identifier used for identifying a target light fixture in the commands 1 and 1' is used as the unique pattern. The unique identifier is transmitted in the command 2 every time the command 2 comprises an activation of the interactions between the target light fixture 70 and the surrounding mobile computing devices 80. Alternatively, the unique identifier is transmitted only once in a configuration command 2, and stored at the target light fixture 70, so that it is not necessary to transmit it every time an activation command 2 is transmitted.

Alternatively, the unique pattern is different from the unique identifier used for identifying a target light fixture in the commands 1 and 1'. The unique pattern is transmitted in the commands 1, 1' and 2 every time the commands 1, 1' and 2 comprise an activation of the interactions between the target light fixture 70 and the surrounding mobile computing devices 80. Alternatively, the unique pattern is transmitted only once in configuration commands 1, 1' and 2, and stored at the target light fixture 70, so that it is not necessary to transmit it every time activation commands 1, 1' and 2 are transmitted.

The commands 1, 1' and 2 may also comprise information for transmission during the interactions of the target light fixture 70 with the surrounding mobile computing devices 80. The information is different from the unique pattern used for identification of the target light fixture 70 by the surrounding mobile computing devices 80. The information is used for engaging the users of the mobile computing devices 80 through interactions 4 with the marketing server 90 represented in FIG. 1

Another example of command 1 generated and transmitted by the fixture management server 50 comprises one or more configuration parameters for configuring the target light fixture 70. In the deployment illustrated in FIG. 3, the transmission via commands 1, 1' and 2 of the configuration parameter(s) to the target light fixture 70 is similar to the aforementioned transmission of the software update. In the deployment illustrated in FIG. 3, the transmission via commands 1 and 2 of the configuration parameter(s) is also similar to the aforementioned transmission of the software update. The commands 1, 1' and 2 may also comprise a time period. The time period includes a delay for performing the configuration after reception of the command 2 by the target light fixture 70, or a precise date and time at which the target light fixture 70 shall perform the configuration. This allows synchronization of the configuration across a plurality of light fixtures. Additionally, instead of a single target light fixture, the configuration may be directed to a plurality of light fixtures, for example all the light fixtures 70 of the geographical area 20 under the control of the slave environment controller 200 in FIG. 3 or under the control of the environment controller 300 in FIG. 4. The command 2 may be implemented via a broadcast message, for prompting all the light fixtures of the geographical area 20 to perform their configuration. For instance, the configuration parameter(s) consist in parameters for controlling one of the following characteristics of the light generated by the target light fixture 70: an intensity of the light, a color of the light, etc.

Referring now to FIG. 3, the master environment controller 100 and the slave environment controllers 200 may be deployed in a daisy-chained communication configuration. The slave environment controllers 200 are daisy-chained and the master environment controller 100 is the source device of the daisy-chained communication configuration.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A master environment controller, comprising:
   a communication interface for exchanging data with a fixture management server and at least one slave environment controller;
   memory for storing a mapping of each of the at least one slave environment controller with a plurality of light fixtures, each one of the plurality of light fixtures being identified by a unique identifier;
   a processing unit for:
      receiving a first command from the fixture management server via the communication interface, the first command comprising a unique identifier of a target light fixture;
      transmitting a second command to the target light fixture, wherein the second command is based on the first command and controls interactions of the target light fixture with mobile computing devices;

determining a target slave environment controller among the at least one slave environment controller based on the unique identifier of the target light fixture and the mapping stored in memory; and transmitting a third command to the target slave environment controller, wherein the third command is based on the first command, comprises the unique identifier of the target light fixture, and controls interactions of the target light fixture with the target slave environment controller.

2. The master environment controller of claim 1, wherein the communication interface is adapted for exchanging data with the at least one slave environment controller over one of the following: a Wi-Fi network, a mesh network, and a combination thereof; the exchanged data comprising the third command.

3. The master environment controller of claim 1, wherein the first command comprises an activation or a deactivation of the interactions of the target light fixture, and the second command comprises the activation or the deactivation of the Interactions of the target light fixture with the mobile computing devices.

4. The master environment controller of claim 1, wherein the first command comprises a unique pattern used during the interactions of the target light fixture for uniquely identifying the target light fixture, and the second command comprises the unique pattern used during the interactions of the target light fixture with the mobile computing devices.

5. The master environment controller of claim 4, wherein the unique pattern is the unique identifier of the target fixture.

6. The master environment controller of claim 1, wherein the first command comprises information for transmission during the interactions of the target light fixture, and the second command comprises information for transmission during the Interactions of the target light fixture with the mobile computing devices; the information being different from a unique pattern used during the interactions of the target light fixture with the mobile computing devices for uniquely identifying the target light fixture.

7. The master environment controller of claim 1, wherein the first command comprises a configuration parameter and a time period defining when the configuration parameter shall be applied to the target light fixture, and the second command comprises the configuration parameter and the time period.

8. An environment controller, comprising:
a communication interface for exchanging data with a plurality of light fixtures;
memory for storing a unique identifier for each one of the plurality of light fixtures;
a processing unit for:
receiving a first command from one of a fixture management server or a master environment controller via the communication interface, the first command comprising a target identifier;
determining a target light fixture among the plurality of light fixtures, the target light fixture having a unique identifier corresponding to the target identifier; and
transmitting a second command based on the first command to the target light fixture, wherein the first command controls Interactions of the target light fixture with mobile computing devices.

9. The environment controller of claim 8, wherein the communication interface is adapted for exchanging data with the plurality of light fixtures over one of the following: a Wi-Fi network, a mesh network, a Bluetooth Low Energy (BLE) network, and a combination thereof; the exchanged data comprising the second command.

10. The environment controller of claim 8, wherein the communication interface is adapted for transmitting the second command to the target light fixture over a mesh network compliant with the 802.11s standard.

11. The environment controller of claim 8, wherein the unique identifier of the target light fixture is mapped to at least one networking identifier used for transmitting the second command to the target light fixture, the mapping being stored in the memory.

12. The environment controller of claim 8, wherein the first command comprises an activation or a deactivation of the interactions of the target light fixture with the mobile computing devices, and the second command comprises the activation or the deactivation.

13. The environment controller of claim 8, wherein the first command comprises a unique pattern used during the interactions of the target light fixture with the mobile computing devices for uniquely identifying the target light fixture, and the second command comprises the unique pattern.

14. The environment controller of claim 13, wherein the unique pattern is the target identifier.

15. The environment controller of claim 8, wherein the first command comprises information for transmission during the interactions of the target light fixture with the mobile computing devices, and the second command comprises the information; the information being different from a unique pattern used during the interactions of the target light fixture with the mobile computing devices for uniquely identifying the target light fixture.

16. The environment controller of claim 8, wherein the first command comprises a configuration parameter and a time period defining when the configuration parameter shall be applied to the target light fixture, and the second comprises the configuration parameter and the time period.

* * * * *